United States Patent
Wenzel et al.

(10) Patent No.: US 7,471,634 B1
(45) Date of Patent: Dec. 30, 2008

(54) METHOD FOR GENERATION OF A SINGLE ACCOUNTING STREAM DURING HETEROGENEOUS ACCESS NETWORK MOBILITY

(75) Inventors: Peter W. Wenzel, Plano, TX (US); Jerry Mizell, Plano, TX (US); David Lauson, McKinney, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1112 days.

(21) Appl. No.: 10/211,826

(22) Filed: Aug. 2, 2002

(51) Int. Cl.
*H04J 3/14* (2006.01)
*H04M 11/00* (2006.01)
*H04M 15/00* (2006.01)

(52) U.S. Cl. .................. 370/241; 455/406; 379/114.01

(58) Field of Classification Search ............... 370/241, 370/252–253; 455/405–406; 709/223; 379/111, 379/114.01
See application file for complete search history.

(56) References Cited

U.S. PATENT DOCUMENTS 7,149,229 B1 * 12/2006 Leung .................... 370/466
2002/0188562 A1 * 12/2002 Igarashi et al. ............. 705/40

OTHER PUBLICATIONS

Postel, J.; "RFC 768 User Datagram," Aug. 28, 1980.

3rd Generation Partnership Project; Technical Specification Group Services and System Aspects; General Packet Radio Service (GPRS); 3GPP Organization Partners, 1999.
"TR45 Wireless IP Network Standard," Jun. 2000.
Johnson, David B. and Charles Perkins, "Mobility Support in IPv6," Jul. 2, 2000.
Perkins, C., "RFC 3220 IP Mobility Support for IPv4,"Network Working Group, Jan. 2002.
Rigney, C.; A. Reubens; W. Simpson; S. Willens; "RFC 2138 Remote Authentication Dial In User Service (RADIUS)"; The Internet Society, Apr. 1997.
Rigney, C.; "RFC 2139 RADIUS Accounting" Network Working Groups Apr. 1997.
Aboba, B.; J.Arkko; D. Harrington, "RFC 2975 Introduction to Accounting Management," The Internet Society, Oct. 2000.
Glass, S., T. Hiller; S.Jacobs; C. Perkins; "RFC 2977 Mobile IP Authentication; Authorization and Accounting Requirements;" The Internet Society; Oct. 2000.

* cited by examiner

*Primary Examiner*—Kevin C Harper
(74) *Attorney, Agent, or Firm*—Hemingway & Hansen, LLP; D. Scott Hemingway (57) ABSTRACT

The present invention supports account monitoring for a mobile node by a home agent communicating with an AAA server computer. The home agent maintains accounting attribute information on system usage by a mobile node on a network. Attribute information is maintained and metered on the home agent in a data table. The home agent generates and transmits accounting messages containing the accounting attributes to the AAA server computer. The AAA server computer stores the attribute information in a memory for later billing.

20 Claims, 3 Drawing Sheets

METHOD FOR GENERATION OF A SINGLE ACCOUNTING STREAM DURING HETEROGENEOUS ACCESS NETWORK MOBILITY

BACKGROUND OF THE INVENTION

The Internet, like so many other high tech developments, grew from research originally performed by the United States Department of Defense. In the 1960s, the military had accumulated a large collection of incompatible computer networks. Because of their incompatible data structures and transmission protocols, many of these computers could not communicate with other computers across network boundaries.

In the 1960s, the Defense Department wanted to develop a communication system that would permit communication between these different computer networks. Recognizing that a single, centralized communication system would be vulnerable to attacks or sabotage, the Defense Department required that the communication system be decentralized with no critical services concentrated in vulnerable failure points. In order to achieve this goal, the Defense Department established a decentralized communication protocol for communication between the computer networks.

A few years later, the National Science Foundation (NSF) wanted to facilitate communication between incompatible network computers at various research institutions across the country. The NSF adopted the Defense Department's protocol for communication, and this combination of research computer networks would eventually evolve into the Internet.

Internet Protocols

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

Two types of transmission protocols may operate with the IP protocol—the Transmission Control Protocol (TCP) or the User Datagram Protocol (UDP). TCP was developed to provide connection-oriented, end-to-end data transmission between packet-switched computer networks, and UDP supports a connection-less transmission between computer networks. Unlike UDP, TCP provides certain error recovery and data-checking services. The combination of TCP or UDP with the IP protocol forms a suite of protocols for communication between computers on the Internet and has become a standard protocol for use in all packet switching networks that provide connectivity across network boundaries.

In a typical Internet-based communication scenario, data is transmitted from an originating communication device on a first network across a transmission medium to a destination communication device on a second network. After receipt at the second network, the network routes the packet to a destination communication device. Because Internet communication uses standard protocols, the IP protocol on the destination communication device decodes the transmitted information into the original information transmitted by the originating device.

TCP/IP Addressing and Routine

A computer operating on a network is assigned a unique physical address under the TCP/IP protocols. This is called an IP address. The IP address can include: (1) a network ID and number identifying a network, (2) a sub-network ID number identifying a substructure on the network, and (3) a host ID number identifying a particular computer on the sub-network. A header data field in the information packet will include source and destination addresses. The IP addressing scheme imposes a consistent addressing scheme that reflects the internal organization of the network or sub-network.

A router is used to regulate the transmission of information packets into and out of the computer network. Routers interpret the logical address contained in information packet headers and direct the information packets to the intended destination. Information packets addressed between computers on the same network do not pass through a router on the boundary of the network, and as such, these information packets will not clutter the transmission lines outside the network. If data is addressed to a computer outside the network, the router on the network boundary forwards the data onto the greater network.

TCP/IP network protocols define how routers determine the transmission path through a network and across network boundaries. Routing decisions are based upon information in the IP header and corresponding entries in a routing table maintained on the router. A routing table contains the information for a router to determine whether to accept an information packet on behalf of a device or pass the information packet onto another router.

Routing tables can be configured manually with routing table entries or with a dynamic routing protocol. A manual routing table can be configured upon initialization. In a dynamic routing protocol, routers update routing information with periodic information packet transmissions to other routers on the network. The dynamic routing protocol accommodates changing network topologies, network architecture, network structure, layout of routers, and interconnection between hosts and routers.

The IP-Based Mobility System

The Internet protocols were originally developed with an assumption that Internet users would be statically connected to a fixed network. With the advent of cellular wireless communication systems, such as mobile communication devices, the movement of Internet users within a network and across network boundaries has become common. Because of this highly mobile Internet usage, the implicit design assumption of the Internet protocols (e.g. a fixed or static user location) is violated by the mobility of the user.

In an IP-based mobile communication system, the mobile communication device (e.g. cellular phone, pager, computer, etc.) can be called a mobile node. Typically, a mobile node maintains connectivity to its home network through a foreign network. The mobile node will always be associated with its home network for IP addressing purposes, and the mobile node will have information routed to it by routers located on the home and foreign networks. The routers can be referred to by a number of names including Home Agent, Home Mobility Manager, Home Location Register, Foreign Agent, Serving Mobility Manager, Visited Location Register, and Visiting Serving Entity.

While coupled to a foreign network, the mobile node is assigned a care-of address. This care-of address is a temporary IP address assigned by the foreign network. Routers on the home and foreign network use the care-of address to route information packets addressed to the mobile node while it resides on the foreign network. During mobile IP communication, the mobile node obtains the care-of address while establishing a wireless link with the foreign agent. The mobile node then transmits a registration message containing the care-of address to the home agent, which updates a routing table entry for the mobile node with the care-of address. When the home network receives information packets addressed to the mobile node, the home agent appends the care-of address to the packet's address header. The modified packets are then forwarded to the correct location using the appended care-of address.

While residing on a foreign network, a mobile node may move from one location to another, changing its connectivity on the foreign network. This movement changes the physical location of the mobile node and requires updating routing tables and care-of addressing to keep up with the movement of the mobile node. Each time the mobile node changes its physical connection to the network, a new registration message is transmitted to the home agent to update the associated routing table entry and permit forwarding of the information packets to the correct location as specified by the care-of address.

Heterogeneous Networks

Many different types of wireless Internet systems are expected to be developed in the future. For instance, heterogeneous networks are envisioned with integrated Third Generation Partnership Project (3GPP) based systems (e.g. Generalized Packet Radio Service (GPRS) derivative systems), Third Generation Partnership Project 2 (3PGPP2) based systems (e.g. IS-95 and Code Division Multiple Access (CDMA) derivative systems), Universal Mobile Telecommunication System (UMTS) based systems, and Wireless Land Access Network (WLAN) based systems. Each network will provide different speeds and levels of coverage as required for optimal communication and utilization of resources for particular uses and users.

Communication devices and subsystems will be expected to automatically select and utilize the appropriate communication system format for a given communication service or utilization. For example, a mobile device may automatically select and utilize a WLAN while indoors, switching to cellular communications when it moves outdoors. This type of service selection and switching will optimize communication services and performance.

Authenticate, Authorize and Accounting ("AAA")

When a mobile node is operating on a foreign network, specialized servers are used to authenticate, authorize, and collect accounting information for services rendered to the mobile node. This authentication, authorization, and accounting activity is called "AAA," and AAA computer servers on the home and foreign network perform many of the required functions for AAA activities.

Authentication is the process of proving one's claimed identity, and security systems on a mobile IP network will often require authentication of the system user's identity before authorizing a requested activity. The AAA server authenticates the identity of an authorized user and authorizes the mobile node's requested activity. Additionally, the AAA server performs the accounting functions by tracking usage on the network.

In a typical mobile communication session, the mobile node generates and transmits an access request message after establishing a connection to the foreign agent. The foreign agent processes the access request, extracting information from the data fields. The foreign agent in turn generates and transmits an access request message to an AAA server on the foreign network containing the information required for AAA. The foreign AAA server forwards the message to the home AAA server, which processes the access request message, authenticating and confirming authorization for the identified mobile node. The home AAA server then transmits an access accept message back to the foreign agent, which processes and forwards the access accept message to the mobile node. The access accept message authorizes the mobile node to establish a communication session using the home agent. This message exchange completes the authentication and authorization process.

With the authorization and authentication complete, the mobile node completes registration of a care-of address with the home agent and proceeds with a communication session. During the communication session, AAA messages are generated and transmitted by the foreign AAA server to the home AAA server for accounting purposes. The home AAA server records the information in the messages to a data storage medium (e.g. tape, computer memory, data disk, etc).

Remote Authentication Dial In User Service (RADIUS) is one widely utilized protocol for AAA. The RADIUS protocol defines message formats and data required for AAA that can be used on virtually any packet-based communication system. Functionally, RADIUS can perform client-server operations, network security, authentication, and accounting using a standard information encoding under a UDP transmission protocol. RADIUS AAA server computers are widely deployed over wireless networks utilizing the RADIUS protocol to perform AAA functions.

As the Internet and mobile communications has continued to evolve, no one standard accounting mechanism has been developed. Mobile IP provides a method for transparent routing of Internet protocol data packets between heterogeneous networks, such as 3GPP, 3GPP2, or WLAN type networks. However, these networks lack a common or compatible accounting protocol or mechanism. Both 3GPP and 3GPP2 have defined but incompatible accounting mechanisms, while WLAN lacks a defined, industry standard. For example, 3GPP2 provides a RADIUS-based accounting scheme capturing data on the Packet Data Serving Node (PDSN), which is also applicable for WLAN access networks. On the other hand, 3GPP uses the Gateway General Packet Radio Service Serving Node (GGSN) to capture accounting data, which is not applicable in CDMA or WLAN systems.

Without a common accounting procedure, performing the AAA functions on a heterogeneous networks with IP is very difficult, if not practically impossible. A common accounting protocol and mechanism would greatly simplify accounting and enhance mobility communications across heterogeneous networks, further encouraging development of integrated heterogeneous networks and optimized wireless packet-based communication.

SUMMARY OF THE INVENTION

The invention establishes a unique procedure for the accounting of IP mobility communications on heterogeneous networks. The new accounting protocol will utilize a unique set of RADIUS protocol messages generated by a home agent on the home network to support the accounting feature. The home agent in the invention will perform the metering functions for communication usage, and then generate and transmit RADIUS accounting messages to the AAA server on the home network. "Metering" functions includes real-time accounting of communication usage by quantifying message flow to and from the mobile node.

The AAA server on the home network will maintain the accounting information while the home agent in the invention updates the home AAA server on the current status of communication usage. In this manner, the home agent provides the accounting functionality normally provided by the foreign network so as to avoid the problems associated with the incompatible heterogeneous systems.

The unique set of messages include an accounting start message to start accounting for communication (Accounting-Request (Start)), an accounting timer message to update accounting for an ongoing communication (Accounting-Request (Interim)), and an accounting stop message to finalize and stop accounting for communication usage (Accounting-Request (Stop)). A RADIUS Accounting-Request (Start) message is generated and sent to an AAA server by the home agent upon initial or subsequent registration and transmission of a registration reply message. The home agent also generates and sends a RADIUS Accounting-Request (Interim) message when an interim timer expires. A RADIUS Accounting-Request (Stop) message is generated and sent when a lifetime timer expires, when the mobile node de-registers, and during inter-foreign agent mobility. The messages are sent to an AAA server, which maintains accounting for mobile devices assigned to the home network.

The RADIUS message data attributes are encoded using the UDP transmission protocol and format. Data attributes sent in the Accounting-Request (Start) message can include data elements for address configured for the user (Framed-IP-Address), name of the user (User-Name), an account session identifier (Acct-Session-ID), time stamp for the event (Event-Timestamp), and network access server IP address (NAS-IP-Address). Data attributes in the Accounting-Request (Stop) and Accounting-Request (Interim) messages include an account session identifier (Acct-Session-ID), an event time stamp (Event-Timestamp), an input message octet count (Acct-Input-Octets), and an output message octet count (Acct-Output-Octets).

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
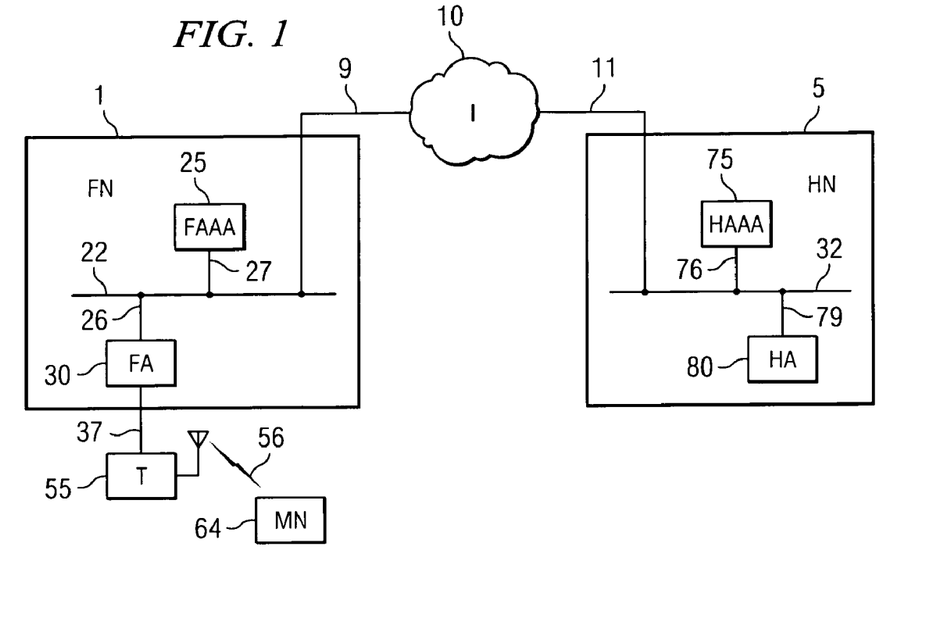
FIG. 1 is a schematic diagram of a mobile IP wireless communication network.

Referring to FIG. 1, a foreign network (FN) 1 and a home network (HN) 5 are connected to the Internet (I) 10. The foreign network 1 has a central buss line 22 that connects to the Internet 10 by communication link 9. A foreign AAA server (FAAA) 25 is coupled to the central buss line 22 by communication link 27. A foreign agent (FA) 30 is coupled to the central buss line 22 by communication link 26. The foreign agent 35 is coupled to transceiver (T) 55 by communication link 37. A mobile node (MN) 64 is coupled to the transceiver 55 by wireless link 56.

The home network 5 has a central buss line 32 coupled to the Internet 10 by communication link 11. A home AAA server (HAAA) 75 is coupled to the central buss line 32 by communication link 76. A home agent (HA) 80 is coupled to the central buss line 32 by communication link 79. The home network 5 is the actual network the mobile node 64 is part of and associated. The home agent 80 is the router that primarily handles routing information packets addressed to the mobile node 64. The home agent 80 maintains a routing table with the updated location associated with the mobile node 64 and may maintain identification confirmation information, such as encrypted identifiers and user passwords for the mobile node 64. The home AAA server 75 maintains accounting information for the mobile node 64 on the home network 5 or foreign network 1, storing or writing the data on some data storage medium such as tape, magnetic hard drive, or disk.

Figure 2:
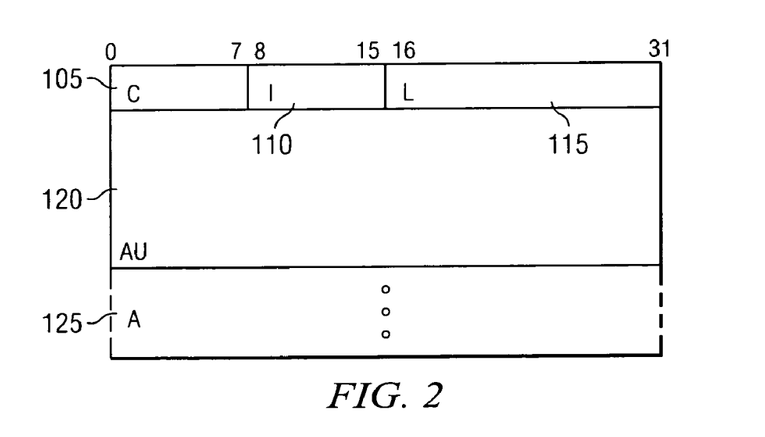
FIG. 2 is a representation of a RADIUS information packet used in the invention for accounting on a wireless, packet-based communication system.

In the invention, the home agent 80 communicates accounting data to the home AAA server 75 using RADIUS accounting messages. FIG. 2 shows the basic configuration of a RADIUS accounting message. The Code field (C) 105 is one octet (e.g. 8-bits or one byte) long and identifies the type of RADIUS message packet. For the accounting request messages used in the invention, the value is "1". The Identifier field (I) 110 is one octet long and helps match request to reply messages. The Length field (L) 115 is two octets long, and the value indicates the length of the packet in octets. The Authenticator field (AU) 120 is sixteen octets long, and is used to authenticate messages. The Attribute field (A) 125 is variable in length and contains the accounting data attributes being transmitted to the home AAA server 75.

Figure 3:
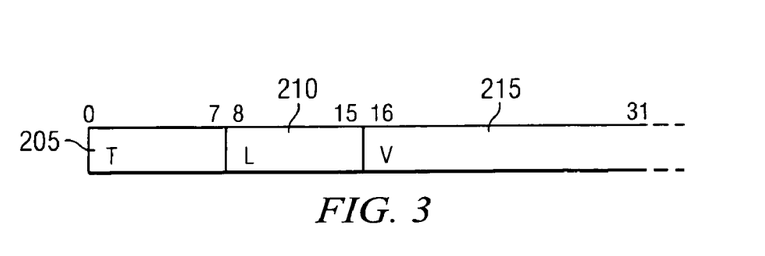
FIG. 3 is a representation of RADIUS attributes used in the RADIUS accounting messages.

FIG. 3 is the basic format for the accounting attributes used in the invention. The Type field (T) 205 is one octet in length. The numeric value of the field designates the type of attribute (e.g. User-Name=1, Framed-IP-Address=8, Acct-Status-Type=40, etc). The Length field (L) 210 is one octet long and indicates the length of the attribute. The Value field (V) 215 contains the information specific to the accounting attribute communicated in the message.

Table 1 shows types of accounting attributes and associated numeric values for the Type data field (FIG. 3) 205 for the different attributes used in the invention.

TABLE 1

| Attribute | Type Data Field Value |
|---|---|
| Acct-Status-Type | 40 |
| Acct-Inputs-Octets | 42 |
| Acct-Outputs-Octets | 43 |
| Acct-Session-ID | 44 |
| User-Name | 1 |

TABLE 1-continued

| Attribute | Type Data Field Value |
|---|---|
| NAS-IP-Address | 4 |
| Framed-IP-Address | 8 |
| Event-Timestamp | 55 |

The Acct-Status-Type attribute designates whether the attribute denotes the beginning of user service (Start), the end of user service (Stop), or an interim update (Interim). The numeric value for the Type field is 40. The Value field for Start equals 1, for Stop equals 2, and for Interim equals 3.

Figure 4:
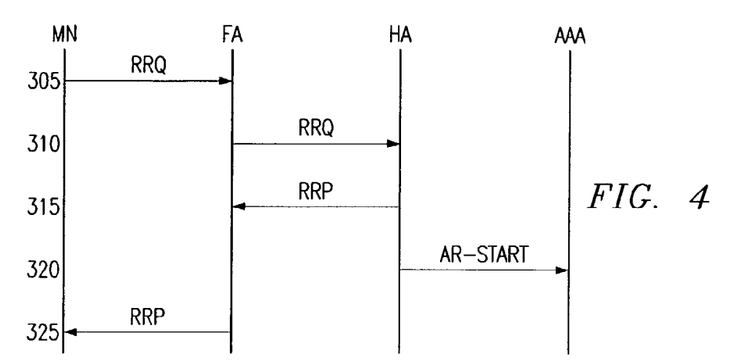
FIG. 4 is a message sequence for initial registration implementing RADIUS accounting under the invention.

FIG. 4 shows the message sequence under the invention implemented during initial registration of a mobile node. At step 305, the mobile node 64 establishes connection to the transceiver 55 and the foreign agent 30. After making the wireless connection with the transceiver 55, the mobile node 64 transmits a Registration Request (RRQ) message to the foreign agent 30. The foreign agent 30 processes the message's information and transmits a Registration Request (RRQ) message over the Internet connection to the home agent 80 in step 310. The home agent 80 establishes a care-of address, creating or updating a routing table entry for the mobile node 64, and generates and transmits a Registration Reply (RRP) message to the foreign agent 30 in step 315, confirming care-of address updating for the mobile node 64.

At step 320, the home agent 80 generates a RADIUS protocol Accounting-Request (Start) message to start accounting for the initiated communication session. The Accounting-Request (Start) message is sent to the home AAA server 75 on the home network 5, initiating accounting for the wireless communication session by mobile node 64. The Accounting-Request (Start) message contains attributes needed to initiate the accounting protocol, which includes User-Name to identify the user, Framed-IP-Address to identify the address configured for the user, Acct-Session-ID to identify the communication session, Event-Timestamp to identify the time the message was generated, and NAS-IP-Address to identify the IP address of the network access server. An Accounting-Request (Start) message will be generated and transmitted each time a Registration Reply message is sent.

The home agent 80 also sets up a data table associated with the mobile node 64 for tracking and storing accounting attribute data during the communication session. This data table supports the metering function performed by the home agent 80. "Metering" functions include real-time accounting of communication usage by quantifying message flow to and from the mobile node 64. During the communication session, the home agent 80 routes information packets addressed to the mobile node 64 and sent from the mobile node 64. This information packet traffic or communication usage is tracked by the home agent 80, which meters the information in the data table, maintaining the communication usage by the mobile node 64.

In step 325, registration for the mobile node 64 is confirmed and completed by a Registration Reply (RRP) message from the foreign agent 30. The foreign agent 30 generates the Registration Reply message upon receipt and processing of the Registration Reply message from the home agent 80 at step 315. This completes the initial registration of the mobile node 64, initiating accounting by the home AAA server 75.

Figure 5:
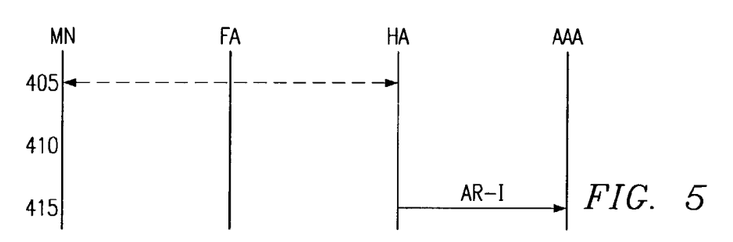
FIG. 5 is a message sequence for the invention where an interim time expires.

FIG. 5 shows the message sequence for accounting upon expiration of an interim time period. At step 405, the mobile node 64, foreign agent 30, home agent 80, and home AAA server 75 perform the initial registration of the mobile node 64 on the foreign network 1, initiating the communication session, registering the care-of address on the home agent 80, as well as starting accounting for the session by the home AAA server 75, all as set forth in FIG. 4. During the time period prior to step 410, the mobile node 64 communicates over the wireless connection 56 with the foreign network 1, its home network 5, and the Internet 10 in a typical communication session.

Step 410 is the start for an interim time period specified by the network or in the AAA protocol to periodically capture accounting data, which occurs each time the specified interim period repeatedly expires during the communication session. During the communication session, the mobile node 64 increases the data values for input message count (Acct-Input-Octets) and output message count (Acct-Output-Octets) depending on the message flow. At step 415, the interim time period expires. Each time the interim period expires, as depicted at step 415, the home agent 80 performs an interim updating by generating and transmitting an Accounting-Request (Interim) (AR-I) message and transmits the message to the home AAA server 75 to update the metered accounting information for the ongoing communication session. The message contains attributes needed to update the accounting, including Acct-Session-ID to identify the session, an Event-Timestamp to identify the time the message was generated, and the metered Acct-Input-Octets and Acct-Output-Octets attributes to update the quantified amount of message data transmitted to and received from the mobile node 64. After transmitting the Accounting-Request (Interim) message, the communication session continues, with periodic Accounting-Request (Interim) messages generated until the communication session terminates.

Figure 6:
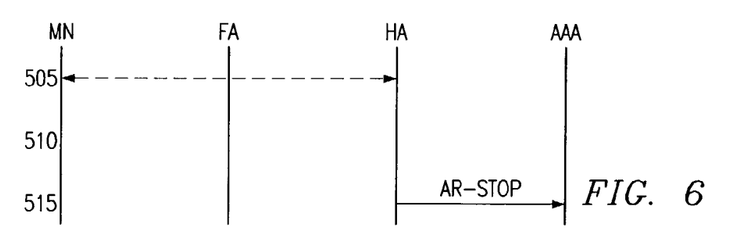
FIG. 6 is a message sequence for the invention where a lifetime expires.

FIG. 6 shows the message sequence used upon expiration of a specified lifetime period. During a communication session, the mobile node 64 periodically transmits a message (e.g. a re-registration message) over the link to the home agent 75. A lifetime is specified on the network whereby if this periodic message is not received within the specified period of time, the communication session will terminate. Typically, the lifetime expires, triggering termination of the communication session, after the wireless link 56 signal is lost, the mobile node 64 loses power, or some other system disruption occurs.

At step 505, the communication session is established and occurs between the mobile node 64, the foreign network 1, the Internet 10, and the home network 5 as depicted in FIG. 4. If communication is disrupted, the lifetime period begins at step 510. During the time subsequent to step 510, there is no communication at the home agent 80 from the mobile node 64. At step 515, the specified lifetime expires requiring termination of the communication session, and the home agent 80 generates and transmits an Accounting-Request (Stop) (AR-STOP) message to the home AAA server 75 to terminate and finalize accounting for the session. The attributes in the message include an Acct-Session-ID to identify the communication session, an Event-Timestamp to identify the time the message was generated, an Acct-Input-Octets with the quantity of message traffic transmitted to the mobile node 64 in octets, and Acct-Output-Octets with the quantity of message traffic transmitted from the mobile node 64 in octets. During the communication session, the home agent 80 meters the message flow and increases input message count (Acct-Input-Octets) and output message count (Acct-Output-Octets) based on message flow to and from the mobile node. The Accounting-Request (Stop) message updates the accounting information maintained by the home AAA server 75, finalizes the accounting for that communication session, terminates the communication session, ceases metering and transmits accounting data to the AAA server 75. The home AAA server 75 writes the finalized data to a memory storage medium for later use and billing to the user.

Figure 7:
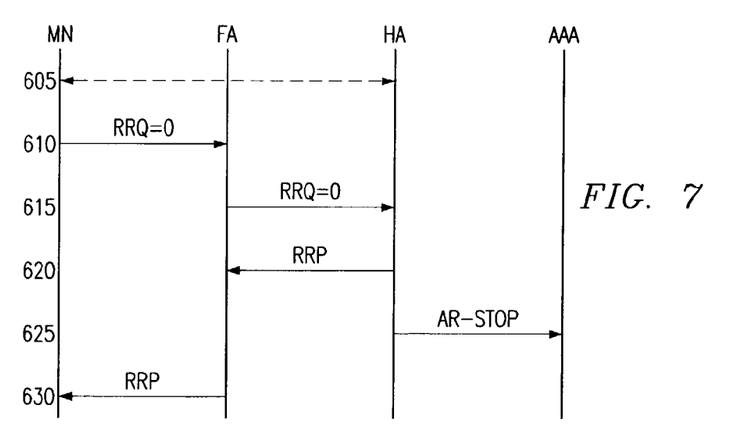
FIG. 7 is a message sequence for the invention during de-registration.

FIG. 7 shows the message sequence used to terminate a communication session and de-register the mobile node 64. At step 605, the mobile communication session is established and communications to and from the mobile node 64 occur. At step 610, the mobile node 64 initiates de-registration and termination of the communication session by generating a Registration Request (Lifetime=0) (RRQ=0) message and transmitting the message to the foreign agent 30. The foreign agent 30 processes the message and transmits a Registration Request (Lifetime=0) message to the home agent 80 at step 615, signifying that the communication session is ending.

At step 620, the home agent 80 transmits a Registration Reply (RRP) message to the foreign agent 30. At step 625, in response to transmitting the Registration Reply message to confirm deregistration of the care-of address, the home agent 80 transmits an Accounting-Request (Stop) (AR-STOP) message to the home AAA server 75, finalizing and terminating the on-going communication session accounting. The attributes in the message include Acct-Session-ID to identify the session, Event-Timestamp to identify the time, Acct-Input-Octets reflecting the total quantified amount of message flow to the mobile node 64 in octets, and Acct-Output-Octets reflecting the total quantified amount of message flow from the mobile node 64 in octets. The home AAA server 75 updates the accounting record in a data storage medium (e.g. disk, tape, hard drive, etc). At step 630, the foreign agent 30 transmits a Registration Reply (RRP) message to the mobile node 64 confirming termination of the communication session by the home agent 80.

Figure 8:
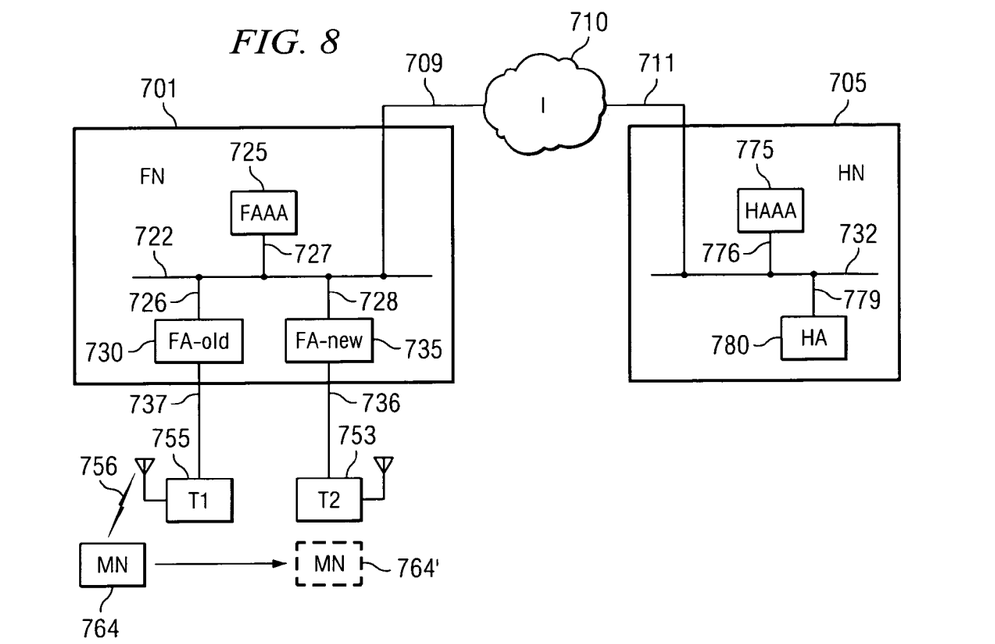
FIG. 8 is a schematic diagram of a mobile IP wireless communication network depicting inter-foreign agent movement by the mobile node.

FIG. 8 depicts a wireless communication network similar to the one in FIG. 1, but the mobile node is shifting connection between two foreign agents on a foreign network. In FIG. 8, the foreign network (FN) 701 consists of a central buss line 722 with a foreign AAA (FAAA) server 725 coupled to the central buss line 722 by communication link 727. An old foreign agent (FA-old) 730, which is routing packets to mobile node 764, is coupled to the central buss line 722 by communication link 726. The old foreign agent 730 is coupled to first transceiver (T1) 755 by communication link 737, and first transceiver (T1) 755 is coupled to the mobile node 764 by wireless link 756.

A new foreign agent (FA-new) 735 is connected to the central buss line 722 by communication link 728. The new foreign agent 735 is linked to a second transceiver (T2) 753 by communication link 736. Mobile node 764 is moving to become mobile node 764', changing connection from first transceiver (T1) 755 to second transceiver (T2) 753. The routing functions must also switch from the old foreign agent 730 to the new foreign agent 735. The foreign network 701 is connected to the Internet (I) 710 by communication link 709 coupled to the central buss line 722.

A home network (HN) 705 is coupled to the Internet 710 by communication link 711, which is coupled to the central buss line 732 on the home network 705. A home AAA server (HAAA) 775 is coupled to the central buss line 732 by communication link 776. A home agent (HA) 780 is coupled to a central buss line 732 by communication link 779.

Figure 9:
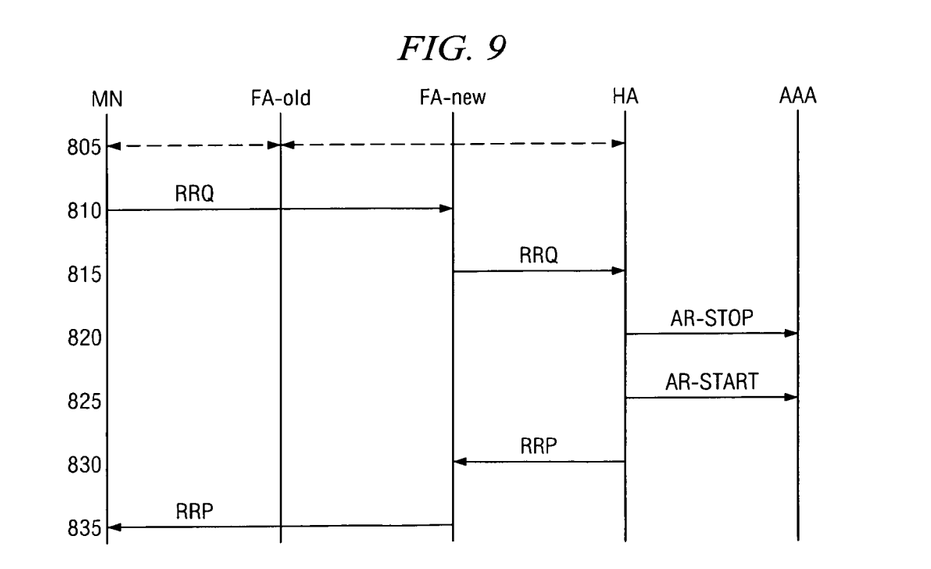
FIG. 9 is a message sequence for movement from one foreign agent to a new foreign agent on the network.

FIG. 9 is the message sequence for the system shown in FIG. 8 where the mobile node 764' connects to the new foreign agent 735. At step 805, the mobile node 764 initially establishes a communication session by connecting with the old foreign agent (FA-old) 730. During the communication session, the mobile node 764 uses the old foreign agent 730 until its movement crosses communication boundaries from the first transceiver 755 to the second transceiver 753. When the mobile node 764 shifts to mobile node 764', it must register a new care-of address for the connection to the new foreign agent 735.

The registration sequence registers the new care-of address with the home agent 780, so that packets addressed to the mobile node 764' will be routed over the foreign network 701 to the correct destination. Upon crossing a boundary before step 810, the mobile node 764' obtains the care-of address for the new connection to the foreign agent 735 on the foreign network 701. At step 810, the mobile node 764' transmits a Registration Request (RRQ) message to the new foreign agent 735 containing a new care-of address. At step 815, the new foreign agent 735 processes the Registration Request (RRQ) message from the mobile node 764' and forwards the Registration Request (RRQ) message to the home agent 780 containing the new care-of address.

When the mobile node 764' changes its wireless communication connection, the accounting information must be updated and new accounting setup for the ongoing communication session using the new system resources (e.g. new foreign agent 735). At step 820, the home agent 780 updates the routing table for the mobile node 764 with the care-of address for mobile node 764' and updates and finalizes the accounting metering for the attributes maintained in the data table on the home agent 780 for mobile node 764. In response to receipt of the Registration Request (RRQ) message at step 815, the home agent 780 generates and transmits a message to stop and finalize accounting for the communication session utilizing old foreign agent 730 with an Accounting-Request (Stop) (AR-STOP) message to the home AAA server 775. The Accounting-Request (Stop) message updates and terminates the accounting relative to the old foreign agent 730 for mobile node 764. The home AAA server 775 writes the data to a memory storage and terminates accounting for that particular account session identifier.

At step 825, the home agent 780 generates and transmits a message to begin new accounting for a new system resource (e.g. the new foreign agent 735). The Accounting-Request (Start) (AR-START) message initiates accounting when the new foreign agent 735 is utilized by the mobile node 764'. The home AAA server 775 writes this new data to a data storage medium, which will have a different account session identifier compared to the earlier, terminated record. At step 830, the home agent 780 transmits a Registration Reply (RRP) message to the new foreign agent 735, confirming registration and updating of the care-of address on the routing table maintained on home agent 780. At step 835, the new foreign agent 735 transmits a Registration Reply (RRP) message to the mobile node 764' to confirm and complete the registration process. The home agent 780 meters the accounting attributes for the mobile node 764/764' throughout the ongoing communication session until the mobile node 764/764' de-registers and terminates the session (e.g. transmits a Registration Request (RRQ) message with a lifetime equal to 0).

In FIG. 1, and as an exemplary protocol for the invention, the Acct-Inputs-Octets attribute indicates how many octets have been received by the mobile node 64 during the communication session, and the numeric value for the Type field is 42. The Acct-Output-Octets indicates how many octets have been sent by the mobile node 64 during the communication session, and the numeric value for the Type field is 43. The Acct-Session-ID attribute is an accounting identifier used to match the accounting log maintained by the AAA server. The value for the Type field is 44. The User-Name attribute is the name of the user, and the numeric value for the Type field is 1. The NAS-IP-Address attribute is the IP address of the network access server (NAS), and the Type numeric value is 4. The Framed-IP-Address attribute indicates the address to be configured for the user, and the associated value is 8. The Event-Timestamp attribute indicates the time the message is generated, and the value of the Type field is 55. Other attributes may be included, but these accounting attributes provide sufficient information for AAA under the invention.

The home AAA server 75 maintains accounting information by writing the data to a data storage device. Data from the home agent 80 is received by the AAA server 75 and written to a memory or data storage medium such as a disk, a tape, a hard drive, or a computer memory. Each individual RADIUS message can be saved, or each RADIUS message associated with a specific session ID can overwrite a previous entry with the final entry saved upon termination of the communication session. The home agent 80 meters the accounting information, maintaining an octet count for sent and received information packet communication for the mobile node 64. The accounting information sent to the AAA server 75 using the information packets is stored for later retrieval and processing (e.g. billing).

In an alternative embodiment, the home AAA server 75 may temporarily maintain accounting data for the various attributes during the communication session in a temporary memory data table, only storing the data for later use at the end of the session or periodically according to a specified time (e.g. a data transfer every 30 minutes), or at a capacity threshold (e.g. one megabyte). The home AAA server 75 may have a temporary memory, overwriting data each time new data is received from the home agent 80 in an accounting message and only storing the final data associated with a specified record identifier (e.g. session account identifier, user name, etc). Also, as an alternative embodiment, the data count received and transmitted by the home agent can be in bits rather than octets (e.g. eight bits or one byte), some specified multiple of eight (e.g. kilobytes), or bits (e.g. megabits).

Although specific RADIUS protocols are described herein, any suitable accounting protocol implemented over the diverse networks can be used. It is also not essential to integrate the diverse networks into a formal heterogeneous network. The central inventive concepts are capturing and metering accounting information for a mobile node on the home agent and transmitting that information to an AAA server from the home agent, or some other routing entity associated with the mobile node, to update account information on the system for a mobile node.

While the invention has been particularly shown and described with respect to preferred embodiments, it will be readily understood that minor changes in the details of the invention may be made without departing from the spirit of the invention.

Having described the invention, we claim:

1. A method for accounting for a mobile node communication usage when the mobile node is transferred from a first foreign agent to a second foreign agent comprising the steps of:
registering the mobile node with the home agent upon connection with a first foreign agent on a first foreign network;
performing a metering function on said home agent for communication usage on the foreign network;
generating an information packet at the home agent containing accounting data derived from said metering function;
updating the routing table on said home agent when said mobile node changes its communication connection from said first foreign agent on said first foreign network to said second foreign agent on a second foreign network;
transmitting a finalize accounting message from the home agent in response to a registration request message received from said second foreign agent, said finalize accounting message will be used to finalize an accounting for the metering function associated with the connection of the mobile node to the first foreign agent; and,
transmitting a begin accounting message from the home agent after transmitting the finalize accounting messages, said begin accounting message will be used to begin an accounting for the metering function associated with the connection of the mobile node to the second foreign agent.

2. The method for accounting for a mobile node communication usage of claim 1, further comprising the steps of:
maintaining a data table containing an accounting data for the mobile node on the home agent; and
metering mobile node communication usage on the home agent by updating entries on the data table.

3. The method for accounting for a mobile node communication usage of claim 2, further comprising the steps of:
receiving said information packet with accounting data for the mobile node at the computer server; and
storing said accounting data for the mobile node in a data storage medium by the computer server.

4. The method for accounting for a mobile node communication usage of claim 1, further comprising the steps of:
establishing a care-of address for the location of the mobile node in a routing table on the home agent using a registration request message transmitted from the mobile node; and
transmitting said information packet containing said accounting data after receiving a registration request message with a new care-of address from the mobile node.

5. The method for accounting for a mobile node communication usage of claim 1, further comprising the step of:
transmitting said information packet containing said accounting data upon expiration of a time period.

6. The method for accounting for a mobile node communication usage of claim 1, wherein the information packet contains a data element indicating the start time for accounting of communications.

7. The method for accounting for a mobile node communication usage of claim 1, wherein the information packet contains a data element indicating the stop time for accounting of communications.

8. The method for accounting for a mobile node communication usage of claim 1, wherein the information packet contains a data element indicating a timer expiration for accounting of communications.

9. The method for accounting for a mobile node communication usage of claim 1, wherein accounting data includes a count for messages received by the mobile node and a count for messages sent by the mobile node.

10. A method for accounting for system usage by a mobile node being transferred from a first foreign agent to a second foreign agent on a foreign network comprising the steps of:
providing a home network having a home agent associated with the mobile node and an accounting server computer coupled to the home agent;

maintaining accounting data for the mobile node communication usage on said accounting server computer while the mobile node is connected to the first foreign agent;

metering of mobile node communication usage with the home agent at the home agent;

transmitting an information packet generated at the home agent containing accounting data derived from said metering to the accounting server computer while the mobile node is connected to the first foreign agent;

updating and storing accounting data for the mobile node while the mobile node is connected to the first foreign agent;

updating the routing table on said home agent when said mobile node changes its communication connection from said first foreign agent on said first foreign network to said second foreign agent on a second foreign network;

transmitting a finalize accounting message from the home agent in response to a registration request message received from said second foreign agent, said finalize accounting message will be used to finalize an accounting for the metering function associated with the connection of the mobile node to the first foreign agent; and, transmitting a begin accounting message from the home agent after transmitting the finalize accounting messages, said begin accounting message will be used to begin an accounting for the metering function associated with the connection of the mobile node to the second foreign agent.

11. The method for accounting for system usage by a mobile node of claim 10 further comprising the step of:
transmitting the information packet containing accounting data after receiving a new care-of address from the mobile node.

12. The method for accounting for system usage by a mobile node of claim 10 further comprising the step of:
transmitting the information packet containing accounting data upon expiration of a specified time period.

13. The method for accounting for system usage by a mobile node of claim 10 further comprising the steps of:
transmitting the information packet to start accounting of mobile node communications;
transmitting the information packet to stop accounting of mobile node communications; and
transmitting the information packet to update accounting data for mobile node communications.

14. The method for accounting for system usage by a mobile node of claim 10 wherein the information packet includes accounting data including the amount of data transmitted to the mobile node and the amount of data transmitted by the mobile node.

15. A system for accounting of resources by a mobile node in a wireless communication network comprising:
a first foreign network with a first foreign agent coupled to the mobile node, and wherein said first foreign network is coupled to a home network;
the home network having a home agent wherein said home agent meters communication usage of the mobile node; and,
an accounting sever computer on said home network, said accounting server computer receives updates on mobile node communication usage from the home agent;
a second foreign network with a second foreign agent, wherein the mobile node transfers its connection from the first foreign agent to said second foreign agent, and said second foreign network is coupled to the home network;
said home agent updating a routing table on said home agent when said mobile node changes its communication connection from said first foreign agent on said first foreign network to said second foreign agent on said second foreign network, said home agent transmits a finalize accounting message from the home agent in response to a registration request message received from said second foreign agent, said finalize accounting message will be used to finalize an accounting for the metering function associated with the connection of the mobile node to the first foreign agent, and said home agent transmits a begin accounting message from the home agent after transmitting the finalize accounting messages, said begin accounting message will be used to begin an accounting for the metering function associated with the connection of the mobile node to the second foreign agent.

16. The system for accounting of resources by a mobile node in a wireless communication network of claim 15 wherein said home agent updates the accounting server on the mobile node communication usage by an information packet transmitted from the home agent.

17. The system for accounting of resources by a mobile node in a wireless communication network of claim 15 wherein said home agent updates the accounting server on communication usage by an information packet transmitted after expiration of a specified time period.

18. The system for accounting of resources by a mobile node in a wireless communication network of claim 16 wherein said information packet includes an accounting data element stored in a memory.

19. The system for accounting of resources by a mobile node in a wireless communication network of claim 16 wherein said information packet is transmitted to start, stop, or update an accounting of mobile node communication usage.

20. The system for accounting of resources by a mobile node in a wireless communication network of claim 15 wherein the accounting server computer receives account updates on mobile node communication usage from the home agent through an information packet comprised of at least one of:
a user identifier data,
a user configured address data,
a session identifier data,
a timestamp data,
a network access server address data,
an input data count data, and
an output data count data.

* * * * *